C. S. LOCKWOOD.
SELF CONTAINED ROLLER BEARING.
APPLICATION FILED MAR. 26, 1909.
954,529.
Patented Apr. 12, 1910.
2 SHEETS—SHEET 1.
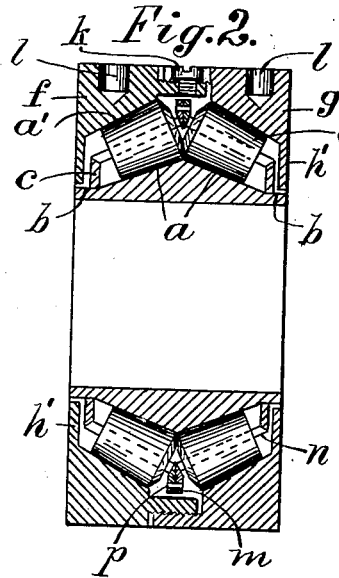
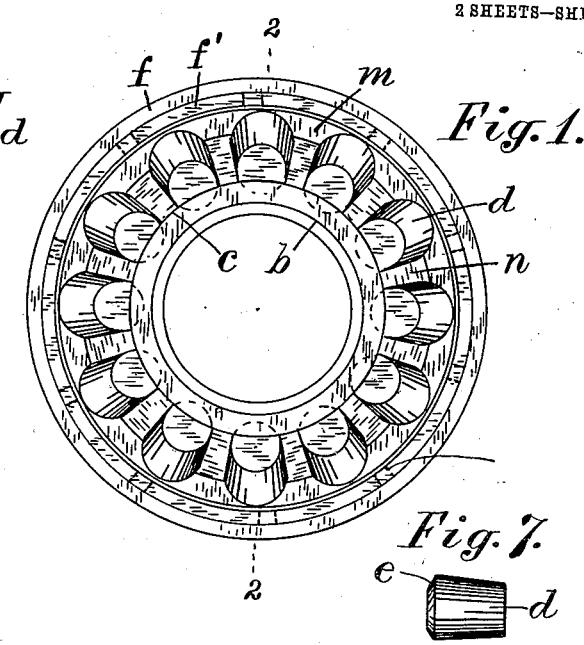
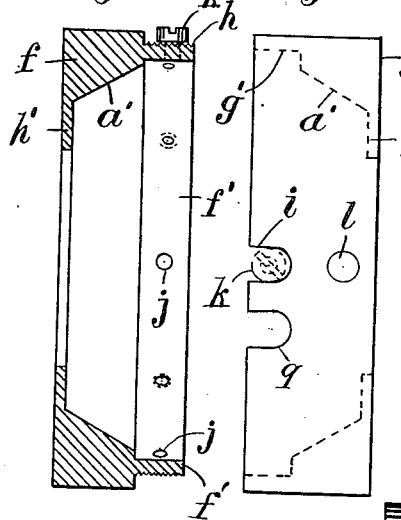
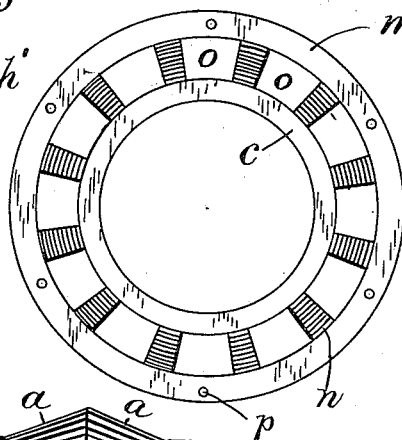
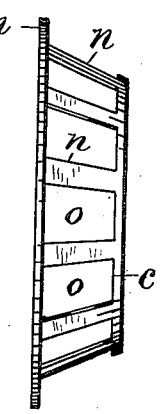
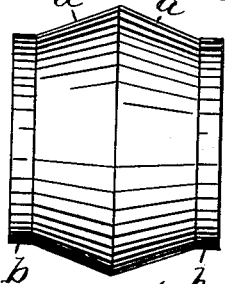
Witnesses:
L. Low.
J. W. Greenbaum
Inventor.
Charles S. Lockwood,
per Thomas S. Crane, Atty.

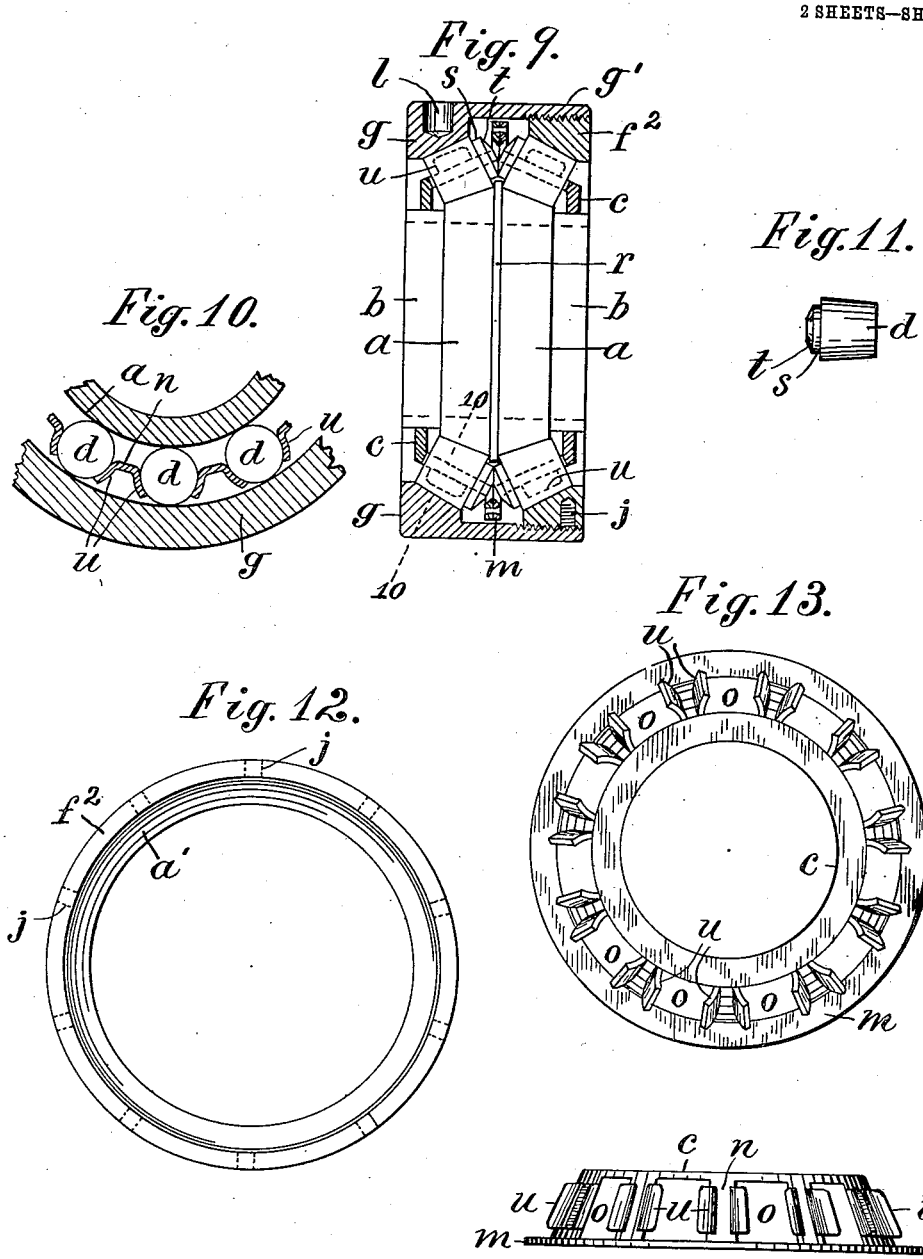

UNITED STATES PATENT OFFICE.

CHARLES S. LOCKWOOD, OF NEWARK, NEW JERSEY, ASSIGNOR TO HYATT ROLLER BEARING COMPANY, OF HARRISON, NEW JERSEY, A CORPORATION OF NEW JERSEY.

SELF-CONTAINED ROLLER-BEARING.

954,529.

Specification of Letters Patent.

Patented Apr. 12, 1910.

Application filed March 26, 1909. Serial No. 485,969.

*To all whom it may concern:*

Be it known that I, CHARLES S. LOCKWOOD, a citizen of the United States, residing at 289 Market street, Newark, county of Essex, and State of New Jersey, have invented certain new and useful Improvements in Self-Contained Roller-Bearings, fully described and represented in the following specification and the accompanying drawings, forming a part of the same.

The present invention relates to that class of roller bearings which is not only self-contained but is adapted to resist pressure either laterally or longitudinally; in other words, it serves both to carry the load and resist end thrusts.

The invention includes a hub having two opposed tapering seats with tapering rolls fitted thereto and a casing formed in two annular parts adapted to embrace the outer sides of the rolls, and the parts of the casing secured together so as to retain all of the fixtures therein, and thus form a self-contained roller bearing. The contiguous ends of the rolls are preferably beveled and fitted to roll in contact with one another, and a doubly conical cage is preferably employed to guide the rolls in their movement within the casing.
A modification of the invention provides a raised collar at the junction of the conical seats upon the hub, and the rolls shouldered to travel adjacent to such collar with their contiguous ends in contact, the collar serving positively to prevent any longitudinal displacement of the rolls.

The invention will be understood by reference to the annexed drawing, in which—

Figure 1 is an end view of the roller bearing with the nearer half of the casing removed; Fig. 2 is a section on line 2—2 in Fig. 1; of all the parts excepting the rolls; Fig. 3 is a similar section of one side of the casing; Fig. 4 is an external view of the opposite side of the casing; Fig. 5 is an end view, and Fig. 6 an edge view of the cage shown in Figs. 1 and 2; Fig. 7 is a side view of one of the rolls; Fig. 8 is a side view of the doubly conical hub. Figs. 9 to 14 show alternative constructions, Fig. 9 being a section like Fig. 2, with the integral collar at the junction of the doubly conical seats; Fig. 10 is a section on line 10—10 in Fig. 9, Fig. 11 is a side view of one of the rolls shown in Fig. 9; Fig. 12 is an inside view of the right-hand half of the casing shown in Fig. 9; Fig. 13 is an end view, and Fig. 14 an edge view of one-half of the cage with lugs thereon to hold the rolls upon the conical seats when removed from the casing.

The convex conical seats $a$ are shown formed upon the hub in Figs. 2 and 8 with their bases joined and cylindrical seats $b$ extended from their outer ends to support the inner flanges $c$ of the cage. The rolls $d$ are tapered in the same proportion as the seats upon the hub, and as pressure upon such tapering rolls has a tendency to slide them endwise such sliding tendency is resisted by rotating the larger ends of the rolls in contact with one another. To increase the wearing surface upon the ends of the rolls, their larger ends are formed with conical surfaces $e$ which roll upon one another when the rolls are held upon their seats by the casing. The casing is shown formed of two rings $f$ and $g$, which are connected by annular flanges $f'$ and $g'$ having screw-threads $h$ to engage one another, and are provided with concave or tapering seats $a'$ to embrace the rolls, and with oil-retaining flanges $h'$ extended inwardly from their outer ends close to the hub. The flanges $h'$ form a pocket in the bottom of the casing which prevents the lubricant from escaping. A notch $i$ is shown in the flange $g'$ and a series of holes $j$ in the flange $f'$, and a screw $k$ is shown in Figs. 2 and 3 inserted in one of the holes and its head fitted to the notch $i$, as shown in dotted lines in Fig. 4. Such engagement of the head with the notch prevents the parts of the casing from rotating upon one another when adjusted, and the series of holes $j$ permits the parts of the casing when the screw $k$ is removed, to be turned upon one another in a fixed degree and secured in their new adjustment by reinserting the screw. To secure a fine adjustment of the casing without greatly multiplying the screw-holes $j$, the flange $g'$ upon the casing may be formed with a notch $q$ additional to the notch $i$, as shown in Fig. 4, and spaced to secure the casing part $g$ in positions intermediate to those effected by using the notch $i$. The addition of the single notch $q$ thus secures the same effect as doubling the entire number of tap-holes $j$. Holes $l$ are shown upon the edges of the parts in Fig. 2 for turning the two halves of the casing by suitable wrenches.

To guide the rolls in their movement and hold their axes in fixed relation to the axis of the shaft upon which the bearing is used, I provide a doubly conical cage formed in two similar parts, each having an outer flange c adapted to rest upon the cylindrical seat b of the hub and a junction flange m adapted for securing to the corresponding flange of the other half of the cage. One half of the cage is shown in Figs. 5 and 6, the two flanges c and m being connected by inclined bars n with inner spaces o adapted to receive the rolls d, to hold them in position. The inclination of the rolls leaves room between the spread ends upon the outer side for the flanges m, while the ends of the rolls rotate in contact adjacent to the seat a. The cage is applied to the hub by fastening the halves upon the opposite ends of the same, with the flanges m in contact and securing such flanges together by screws or rivets p, as shown in Fig. 2.

Where the hub is largest at the middle, as in the present construction, the rolls are also largest at their contiguous ends, and the casing cannot be applied except it be made divisible and the parts provided with concave seats to embrace the rolls, and suitably united together to fit snugly upon the rolls when in operation.

With the flanges $f'$ and $g'$ screwed together and locked in their adjusted position by the screw k, the casing is entirely rigid and can be secured in any part of the mechanism in which the roller bearing is used to support a rotating axle, the hub being secured upon the axle to rotate therewith.

In the modification shown in Fig. 9, a raised collar r is formed at the junction of the conical seats upon the hub, and the inner corners of the rolls are arranged to rotate adjacent to this collar which thus prevents either of them from moving longitudinally upon its seat. To bring the ends of the rolls in contact, they are formed with bosses s upon their inner ends having conical seats t formed thereon which contact with one another above the periphery of the collar r. The bosses thus resist the natural thrust of the rolls toward one another, while the collar r resists any tendency of the rolls to move from their normal path.

Figs. 9, 10, 13 and 14 show the cage formed with lugs u at the opposite sides of the openings o, which lugs are curved over the outer sides of the rolls, as shown in Fig. 10, and thus prevent the rolls from falling out of the cage when the casing is removed. As it is sometimes necessary to remove the two rings which form the casing from one another to clean out the same or examine the condition of the bearing, it is obvious that the rolls would fall out of the bearing unless thus retained by the cage. The lugs upon the cage thus greatly facilitate the use of the bearing and the handling of all of the parts at any time when the casing is removed from the rolls.

In practice, the cage is stamped from sheet-metal in suitable dies, the lugs u being cut and bent upwardly from the slots o in the final stage of manufacture, thus forming each half of the cage in a single piece with all of its lugs.

I have not claimed herein the means of locking, when adjusted, the tapering seat which embraces the outer sides of the two series of rolls, as I have claimed the same in a co-pending application No. 523,285 filed Oct. 18, 1909 with title, "Self-contained roller-bearing with locked casing."

Having thus set forth the nature of the invention what is claimed herein is:

1. In a self-contained roller bearing, the combination, with a hub having conical seats joined at their bases and provided at the junction with a raised collar, of two sets of tapering rolls fitted to such seats with their larger ends adjacent to the collar, and a divisible casing with opposed tapering seats to embrace the outer sides of the rolls.

2. In a self-contained roller bearing, the combination, with a hub having conical seats joined at their bases and provided at the junction with a raised collar, of two sets of tapering rolls fitted to such seats with their larger ends adjacent to the collar, bosses upon the contiguous ends of the rolls with conical contact surfaces, and a divisible casing with opposed conical seats to embrace the outer sides of the rolls.

3. The roll fixtures for a roller bearing, consisting of a hub having conical seats with their bases joined, two sets of tapering rolls fitted to such seats with their larger ends adjacent, a doubly conical cage having apertures for the rolls, flanges at the opposite ends of the cage to ride upon the hub, and lugs adjacent to the apertures for holding the rolls upon the conical hub until applied to their casing.

4. In a self-contained roller bearing, the combination, with a hub having conical seats with their bases joined and cylindrical seats at their outer ends, of conical rolls fitted to travel upon such seats and having their larger ends fitted to roll in contact with one another at their inner corners and spread apart at their outer corners, a divisible casing with concave seats to embrace such rolls, and a divisible doubly conical cage having apertures for the rolls and junction-flanges between the spread ends of the rolls, and having outer flanges adapted to ride upon the cylindrical seats of the hub.

5. A cage for a self-contained roller bearing having two sets of tapering rolls with their bases rotated in contact with one another upon conical seats, such cage consisting of two similar parts provided each with the flanges c and m with sloping bars n connecting the flanges and lugs u curved upwardly from the bars and adapted to retain the rolls upon their conical seats, each half of the casing thus being formed of one piece of metal, substantially as herein described.

In testimony whereof I have hereunto set my hand in the presence of two subscribing witnesses.

CHARLES S. LOCKWOOD.

Witnesses:
ALFRED P. SLOAN, Jr.,
H. E. SAUL.